United States Patent
Cha (10) Patent No.: US 12,344,276 B2
(45) Date of Patent: Jul. 1, 2025

(54) METHOD AND APPARATUS FOR PROVIDING ON-DEMAND SERVICE USING AUTONOMOUS VEHICLE

(71) Applicant: ELECTRONICS AND TELECOMMUNICATIONS RESEARCH INSTITUTE, Daejeon (KR)

(72) Inventor: Hongki Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 17/951,489

(22) Filed: Sep. 23, 2022

(65) Prior Publication Data

US 2023/0094987 A1   Mar. 30, 2023

(30) Foreign Application Priority Data

Sep. 24, 2021 (KR) .................. 10-2021-0126612
Sep. 23, 2022 (KR) .................. 10-2022-0120952

(51) Int. Cl.
*B60W 60/00* (2020.01)
*G06Q 10/0631* (2023.01)
*G06Q 50/40* (2024.01)

(52) U.S. Cl.
CPC .. *B60W 60/0024* (2020.02); *B60W 60/00253* (2020.02); *G06Q 10/06316* (2013.01); *G06Q 50/40* (2024.01)

(58) Field of Classification Search
CPC ........ B60W 60/0024; B60W 60/00253; G06Q 10/06316; G06Q 50/40
See application file for complete search history.

(56) References Cited

U.S. PATENT DOCUMENTS

| | | | |
|---|---|---|---|
| 9,958,272 B2* | 5/2018 | Morris, IV | G01C 21/3415 |
| 10,573,096 B1* | 2/2020 | Harvey | G06Q 10/20 |
| 11,358,613 B2 | 6/2022 | Hur | |
| 2008/0275643 A1* | 11/2008 | Yaqub | G01C 21/343 |
| | | | 340/995.19 |
| 2010/0106539 A1* | 4/2010 | Kenefic | G06Q 10/063 |
| | | | 705/7.26 |
| 2012/0290506 A1* | 11/2012 | Muramatsu | G01C 21/3679 |
| | | | 701/400 |

(Continued)

FOREIGN PATENT DOCUMENTS

KR  10-2019-0123361 A   11/2019
KR  10-2020-0072581 A   6/2020

(Continued)

*Primary Examiner* — Thomas E Worden
*Assistant Examiner* — Madison B Emmett
(74) *Attorney, Agent, or Firm* — LRK PATENT LAW FIRM (57) ABSTRACT

A service providing device includes a processor, a memory, and a communication device, wherein the processor executes a program stored in the memory to perform: starting a trip by controlling an autonomous vehicle; calculating an expected completion time of the trip according to a predetermined update period; and determining whether the trip is completed within a target time according to the expected completion time of the trip is provided.

17 Claims, 5 Drawing Sheets

(56) References Cited

U.S. PATENT DOCUMENTS

| | | | |
|---|---|---|---|
| 2015/0046081 A1* | 2/2015 | Brand | G01C 21/362 |
| | | | 701/430 |
| 2017/0067746 A1* | 3/2017 | Lei | G01C 21/3697 |
| 2018/0032955 A1* | 2/2018 | Lindawati | G06Q 10/06314 |
| 2018/0081360 A1* | 3/2018 | Bostick | G05D 1/0297 |
| 2019/0206257 A1* | 7/2019 | Igata | G05D 1/0088 |
| 2020/0151631 A1* | 5/2020 | Lamers | G08G 1/202 |
| 2020/0166352 A1 | 5/2020 | An et al. | |
| 2020/0173800 A1* | 6/2020 | Dudar | G06Q 50/40 |
| 2020/0174475 A1 | 6/2020 | Min et al. | |
| 2022/0198931 A1* | 6/2022 | Dayal | G07C 5/085 |
| 2022/0397407 A1* | 12/2022 | Ge | G08G 1/096855 |

FOREIGN PATENT DOCUMENTS

| | | |
|---|---|---|
| KR | 10-2021-0011258 A | 2/2021 |
| KR | 10-2293051 B1 | 8/2021 |

* cited by examiner

METHOD AND APPARATUS FOR PROVIDING ON-DEMAND SERVICE USING AUTONOMOUS VEHICLE

CROSS-REFERENCE TO RELATED APPLICATIONS

This application claims priority to and the benefit of Korean Patent Application No. 10-2021-0126612 filed in the Korean Intellectual Property Office on Sep. 24, 2021, and Korean Patent Application No. 10-2022-0120952 filed in the Korean Intellectual Property Office on Sep. 23, 2022, the entire contents of which are incorporated herein by reference.

BACKGROUND OF THE INVENTION

1. Field of the Invention

This description relates to a method and apparatus for providing an on-demand service using an autonomous vehicle.

2. Description of Related Art

Automobile manufacturers and autonomous driving platform developers around the world are conducting trial runs of autonomous vehicles. If autonomous driving technology of level 4 or higher (based on SAE J3016 standard) is developed in the future, it is expected that the autonomous vehicles that do not require driver intervention will rapidly spread and services related to the autonomous vehicles will be developed and distributed.

The above information disclosed in this Background section is only for enhancement of understanding of the background of the invention, and therefore it may contain information that does not form the prior art that is already known in this country to a person of ordinary skill in the art.

SUMMARY OF THE INVENTION

Embodiments provide an apparatus for providing a service using an autonomous vehicle.

Embodiments provide a method for providing a service using an autonomous vehicle.

According to an embodiment, a service providing device is provided. In such embodiment, the device includes: a processor, a memory, and a communication device, wherein the processor executes a program stored in the memory to perform: starting a trip by controlling an autonomous vehicle; calculating an expected completion time of the trip according to a predetermined update period; and determining whether the trip is completed within a target time according to the expected completion time of the trip.

In an embodiment, the processor may execute the program to further perform: changing an execution order of a plurality of tasks included in the trip when it is determined that the trip cannot be completed within the target time; and recalculating an expected completion time according to the changed execution order.

In an embodiment, the processor may execute the program to further perform performing the trip according to the changed execution order when the recalculated expected completion time does not elapse the target time.

In an embodiment, the processor may execute the program to further perform: transmitting a delay prediction notification of the trip to a user terminal when the recalculated expected completion time elapses the target time; and determining whether to continue the trip based on a selection of the user transmitted according to the delay prediction notification.

In an embodiment, the processor may execute the program to further perform receiving a request for execution of an on-demand service through an autonomous vehicle from a user terminal, and wherein the request for execution may include trip information for executing the trip.

In an embodiment, the processor may execute the program to further perform: determining whether the trip is completable based on the trip information and a current state of the autonomous vehicle; and responding to the request for execution according to whether the trip is completable.

In an embodiment, when the processor performs the determining whether the trip is completable based on the trip information and a current state of the autonomous vehicle, the processor may perform determining a completion probability of the trip based on the trip information and the current state of the autonomous vehicle.

In an embodiment, when the processor performs the responding to the request for execution according to whether the trip is completable, the processor may perform responding that the trip is completable when the completion probability exceeds a predetermined threshold; or responding that the trip is not completable when the completion probability does not exceed the predetermined threshold.

According to another embodiment, a method of providing a service through an autonomous vehicle is provided. In such embodiment, the method includes: starting a trip by controlling the autonomous vehicle; calculating an expected completion time of the trip according to a predetermined update period; and determining whether the trip is completed within a target time according to the expected completion time of the trip.

In an embodiment, the method may further include changing an execution order of a plurality of tasks included in the trip when it is determined that the trip cannot be completed within the target time; and recalculating an expected completion time according to the changed execution order.

In an embodiment, the method may further include performing the trip according to the changed execution order when the recalculated expected completion time does not elapse the target time.

In an embodiment, the method may further include transmitting a delay prediction notification of the trip to a user terminal when the recalculated expected completion time elapses the target time; and determining whether to continue the trip based on a selection of the user transmitted according to the delay prediction notification.

In an embodiment, the method may further include receiving a request for execution of an on-demand service through an autonomous vehicle from a user terminal, and wherein the request for execution may include trip information for executing the trip.

In an embodiment, the method may further include determining whether the trip is completable based on the trip information and a current state of the autonomous vehicle; and responding to the request for execution according to whether the trip is completable.

In an embodiment, the determining whether the trip is completable based on the trip information and a current state of the autonomous vehicle may include determining a completion probability of the trip based on the trip information and the current state of the autonomous vehicle.

In an embodiment, the responding to the request for execution according to whether the trip is completable may include responding that the trip is completable when the completion probability exceeds a predetermined threshold; or responding that the trip is not completable when the completion probability does not exceed the predetermined threshold.

According to yet another embodiment, a method of providing a service through an autonomous vehicle is provided. In such embodiment, the method includes: receiving a request for execution of an on-demand service through an autonomous vehicle from a user terminal; determining whether a trip for the on-demand service is completable based on trip information included in the request for execution and a current state of the autonomous vehicle; and responding to the request for execution according to whether the trip is completable, wherein the trip includes a plurality of tasks of the on-demand service.

In an embodiment, the determining whether the trip is completable based on the trip information and the current state of the autonomous vehicle may include determining a completion probability of the trip based on the trip information and the current state of the autonomous vehicle.

In an embodiment, the responding to the request for execution according to whether the trip is completable may include responding that the trip is completable when the completion probability exceeds a predetermined threshold; or responding that the trip is not completable when the completion probability does not exceed the predetermined threshold.

In an embodiment, the method may further include start the trip by controlling the autonomous vehicle after it is determined that the trip is completable; calculating an expected completion time of the trip according to a predetermined update period; and determining whether the trip is completed within a target time according to the expected completion time of the trip and changing an execution order of the plurality of tasks included in the trip according to the determination result.

DETAILED DESCRIPTION OF THE EMBODIMENTS

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, a user terminal or a terminal may be called user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

Figure 1:
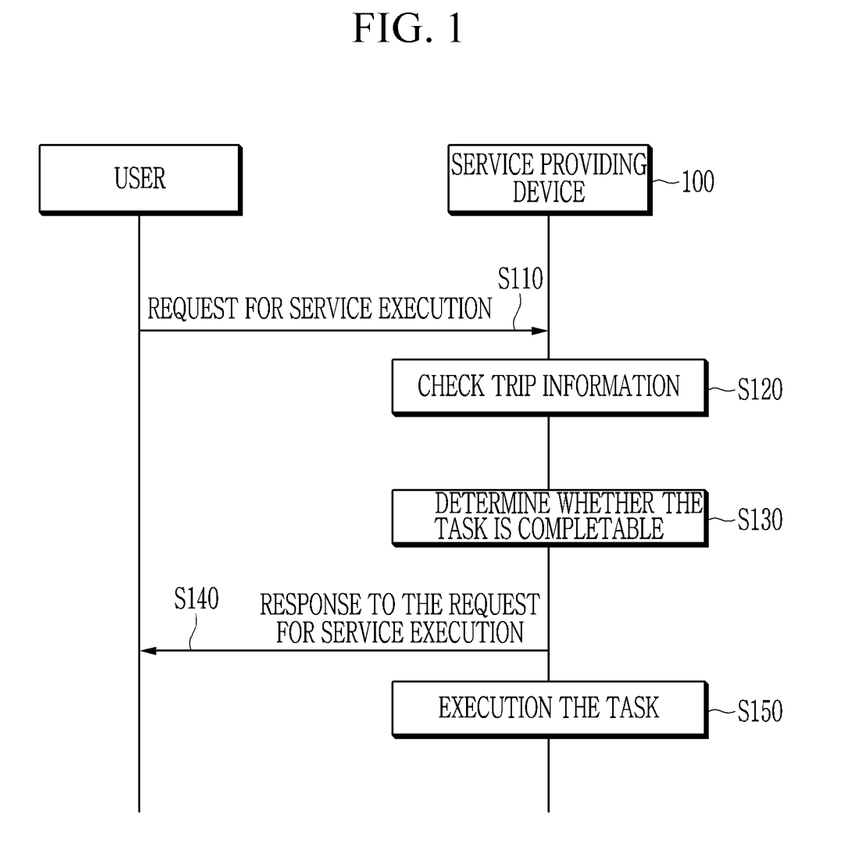
FIG. 1 is a flowchart illustrating a method for providing an on-demand service according to an embodiment.

FIG. 1 is a flowchart illustrating a method for providing an on-demand service according to an embodiment.

An autonomous vehicle or a self-driving car or an ADS-DV (Automated Driving System-Dedicated Vehicle) according to an embodiment may perform tasks for an owner or a user of the autonomous vehicle in a state where no person is on board. For example, while the owner is at work, the autonomous vehicle may help the user to go home more quickly after work by going to market and refueling in advance.

The user may request execution of an on-demand service through the autonomous vehicle to a service providing device 100 through a terminal (S110). The request for service execution may include trip information regarding at least one task to be performed by the autonomous vehicle. For example, the trip information may include a task type for at least one task, a completion time of the tasks, and the like. When the trip information includes a plurality of task types, the trip information may include information about an execution sequence for the plurality of task types and may include an entire completion time (target time) of the plurality of task types.

In an embodiment, the user may select predetermined trip information in advance or input new trip information to the terminal. When inputting the new trip information to the terminal, the user may set the type of task, the completion time for each tasks, the target time for the completion of the entire task, and the execution sequence between the plurality of tasks. The predetermined trip information or new trip information may be carried by the request for service execution to be transmitted to the service providing device 100.

In an embodiment, the completion time of the task to be transmitted to the service providing device 100 may be any one of a time at which the corresponding task should be completed and a time at which the task should be executed. For example, when the task type is a pickup task for an object and the time when the task should be completed is 12:00, the autonomous vehicle needs to pick up the object at any point before the completion time 12:00. Alternatively, when the task type is a food pickup task and the time when the task is to be executed is 13:00, the autonomous vehicle needs to pick up food from the task location at 13:00.

The service providing device 100 may be a program installed in the terminal of the user and operated by a processor and a memory in the terminal or a server capable of wired/wireless communication with the terminal.

The service providing device 100 according to an embodiment may check the trip information of the tasks requested in the request for service execution (S120) and may determine whether the trip is completable based on the trip information and a current state of the autonomous vehicle (S130). The service providing device 100 according to an embodiment may determine the executability/non-executability of the trip based on the trip information and the current state of the autonomous vehicle or may determine a completion probability of the trip to check whether the trip is completable.

In an embodiment, when the task indicated by the user is a pickup task of goods/food and the trip information of the pickup task includes a pickup location and/or pickup time, the service providing device 100 according to an embodiment may determine, based on the pickup location and/or the pickup time of the pickup task and the state of the autonomous vehicle (the current location of the autonomous vehicle, the current battery level, etc.), the completion probability of the trip or determine whether the task is completable or not. Alternatively, after calculating the completion probability of the trip, the service providing device 100 may determine that the trip is completable when the calculated completion probability exceeds a predetermined threshold or may determine that the trip is not completable when the calculated completion probability does not exceed the predetermined threshold.

For example, when the trip information of the pickup task includes the pickup location, the service providing device 100 may determine the completion probability of the trip and/or may determine completable/non-completable of the task based on the expected drivable distance based on the remaining battery level of the autonomous vehicle and the path to the pickup location.

Alternatively, when the trip information of the pickup task includes the pickup location and the pickup time, the service providing device 100 may determine the completion probability of the trip and/or may determine completable/non-completable of the task based on the estimated time required to the pickup location and the predetermined pickup time. The service providing device 100 may determine the estimated time required for the autonomous vehicle to reach the pickup location by using real-time traffic information and/or predicted traffic information.

In an embodiment, when the autonomous vehicle is charging or executing another task, the service providing device 100 may determine the completion probability of the trip and/or completable/non-completable of the task in consideration of the expected completion time of the currently executing task.

For example, when the service providing device 100 receives the request for service execution from the user terminal while the autonomous vehicle is being charged, the service providing device 100 may stop the charging and execute the task or may execute the task after the charging is completed in consideration of the power consumption required to perform the task, the task completion time, the target time, etc. When the charged power is insufficient to make a round trip to the task location but there is enough time to complete the task, the service providing device 100 may determine that the trip is completable. Alternatively, the service providing device 100 may determine that the trip is completable when the task can be completed only by starting to the task location before the charging is completed and make the round trip to the task location only with the already charged power. However, if the charged power is insufficient to make the round trip to the task location and expected charging completion time is after the completion time of the task, the service providing device 100 may determine that the trip is not completable. In an embodiment, the service providing device 100 may determine the completion probability of the trip according to the current traffic situation information or the future traffic situation prediction information, and determine whether the trip is completable or not completable according to the determined completion probability.

In an embodiment, when the request for service execution includes a plurality of trip information, the service providing device 100 may determine the execution sequence of each task according to a predetermined execution criterion. In this case, the service providing device 100 may select a task execution sequence having the fastest expected completion time or a task execution sequence having the least fuel/power consumption.

In an embodiment, the service providing device 100 may determine the execution sequence of the plurality of tasks according to the task types. For example, when the task type of one of the plurality of trip information is a food/food pickup task, the service providing device 100 may determine to execute the pickup task last.

Thereafter, the service providing device 100 may respond to the request for service execution of the user (S140) and may execute the task according to the request for service execution of the user (S150). When the service providing device 100 responds that the trip is completable, the service providing device 100 may execute the task when the user's response is confirmed or may execute the task according to the target time of the trip information.

When the service providing device 100 responds that the trip is not completable or cannot be completed, the service providing device 100 may execute the task after the trip information or the request for service execution is modified by the user. Alternatively, when the user re-requests the execution even though the service providing device 100 responds that the trip is not completable, the service providing device 100 may execute the task according to the re-request. In this case, it may be considered that the user has agreed in advance that the task or a plurality of tasks may not be completed within the completion time of the task or within the target time.

Figure 2:
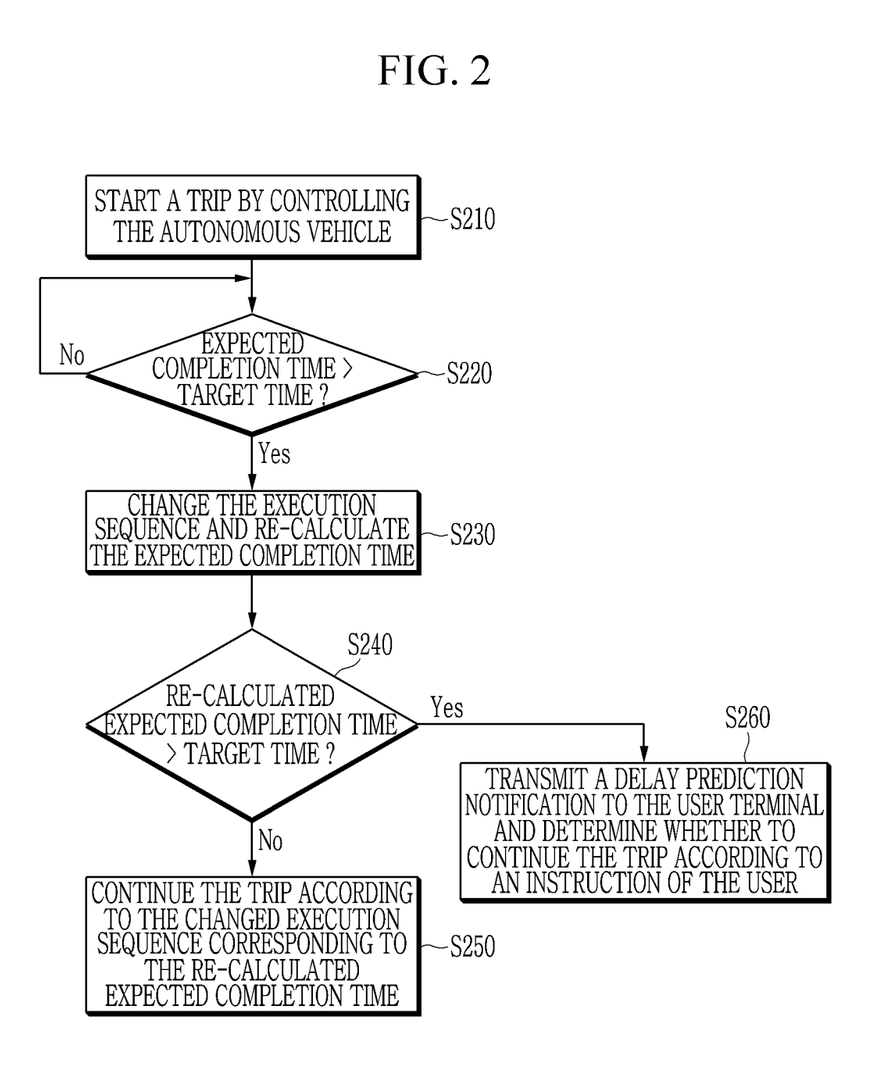
FIG. 2 is a flowchart illustrating a method for executing an on-demand service according to an embodiment.

FIG. 2 is a flowchart illustrating an method for executing an on-demand service according to an embodiment.

Referring to FIG. 2, the service providing device 100 may start a trip according to the request for execution of an on-demand service by controlling the autonomous vehicle (S210).

The service providing apparatus 100 according to an embodiment may calculate an expected completion time of the trip according to a predetermined update period and compare the calculated expected completion time with the target time (S220). For example, when the calculated expected completion time does not exceed the target time, the service providing device 100 may continue the trip and recalculate the expected completion time of the trip in the next update cycle.

However, when the calculated expected completion time exceeds the target time, the service providing device 100 may change the execution sequence of a plurality of tasks and re-calculate the expected completion time of the trip according to the changed execution sequence (S230). After that, when the estimated completion time recalculated according to the changed execution sequence does not exceed the target time (S240), the service providing device 100 may perform the trip according to the changed execution sequence (S250).

When there is no execution sequence capable of shortening the expected completion time, the service providing device 100 may transmit a delay prediction notification to the user terminal and determine whether to continue the trip according to the instruction of the user determined under the delay prediction notification (S260).

The user who has received the delay prediction notification may instruct the service providing device 100 to continue the execution of the task or instruct the execution of the task to be stopped. Alternatively, the user may re-instruct the task to the service providing device 100 by changing the target time.

When the trip includes a plurality of tasks and an expected delay notification is sent when some of the plurality of tasks have not been completed, the user may instruct the service providing device 100 to stop all remaining tasks or to withdraw some of the remaining tasks and continue executing others.

The service providing device 100 according to an embodiment may perform machine learning on a difference between the calculated expected completion time and the actual end time when starting the trip after completion of the trip, and may infer a trigger time for completing the trip within the target time based on the learning result.

In an embodiment, the trigger time ($t_{TRIGGER}$) may be a time to be considered for the autonomous vehicle to complete the trip and return within the target time t. The service providing device 100 may start the autonomous vehicle by the trigger time earlier than the start time of the trip determined by a route search apparatus (GPS navigation, etc.). The trigger time may be updated according to the algorithm below. The service providing device 100 may calculate the expected completion time ($t_A$) of the trip before starting the trip. The expected completion time of the trip may be the time required for the autonomous vehicle to return to the predetermined location after completing at least one task included in the trip. The service providing device 100 may update the expected completion time of the trip according to a predetermined period and the service providing device 100 may start the trip when the updated expected completion time approaches the target time. That is, the service providing device 100 may start the trip when the remaining time from the current time to the target time is greater than the expected completion time of the trip.

The service providing device 100 may start the trip as early as the trigger time to ensure the completion of the trip. In an embodiment, the service providing device 100 may start the trip according to the determination by Equation 1 below.

$$t - t_A \leq t_{TRIGGER} \quad \text{(Equation 1)}$$

That is, the service providing device 100 may start the trip when the difference between the time remaining until the target time and the expected completion time of the trip is equal to the trigger time or shorter than the trigger time. For example, when the updated estimated completion time of the trip is 3 hours 30 minutes and the trigger time is 30 minutes, the service providing device 100 may start the trip when 4 hours remain until the target time. When the trip starts, the service providing device 100 may store a start time ($t_{START}$) of a trip and an expected completion time ($t_{A\_START}$) of the trip at that time.

The service providing device 100 may calculate the difference $t_\Delta$ between the actual end time and the expected completion time determined at the time of the trip start after completing the trip.

$$t_{END} - t_{ESTIMATE} = t_\Delta \quad \text{(Equation 2)}$$

When $t_\Delta$ is a positive number, it may be determined that the trip has ended later than the expected end time determined when the trip starts and the service providing device 100 has not safely predicted the end time. When $t_\Delta$ is a negative number, it may mean that the trip is terminated earlier than the expected end time determined when the trip starts.

The service providing device 100 may use $t_\Delta$ to update the trigger time corresponding to the start time of the trip. In an embodiment, the service providing device 100 may update the trigger time corresponding to the start time of the trip by multiplying $t_\Delta$ by the probability density function of the standard normal distribution (N(0,1)). For example, the service providing device 100 may multiply $t_\Delta$ by a probability value corresponding to a Z value of the standard normal distribution as shown in Equation 3 below.

$$[t_{START}, t_{TRIGGER}] \leftarrow t_{TRIGGER} = \begin{cases} t_{TRIGGER} + t_\Delta \times (0.5 \times 2), & \text{if } t_{START} = t_{START} \\ t_{TRIGGER} + t_\Delta \times (0.46 \times 2), & \text{if } t_{START} = t_{START} \pm 1 \\ t_{TRIGGER} + t_\Delta \times (0.42 \times 2), & \text{if } t_{START} = t_{START} \pm 2 \\ \vdots \\ t_{TRIGGER} + t_\Delta \times (0.15 \times 2), & \text{if } t_{START} = t_{START} \pm 10 \end{cases} \quad \text{(Equation 3)}$$

For example, the service providing device 100 may multiply the trigger time ($t_{TRIGGER}$) corresponding to the start time ($t_{START}$) of the trip by n times (n=2 in equation 3) of the value 0.5 corresponding to the Z value (Z=0) of the standard normal distribution.

The service providing device 100 may multiply the trigger time ($t_{TRIGGER}$) within 1 minute before and after the start time of the trip ($t_{START}$) by n times of the value 0.46 corresponding to the Z value (Z=−0.1) of the standard normal distribution table.

The service providing device 100 may multiply the trigger time ($t_{TRIGGER}$) within 1 to 2 minutes before and after the start time of the trip ($t_{START}$) by n times of the value 0.42 corresponding to the Z value (Z=−0.2) of the standard normal distribution table.

The service providing device 100 may multiply the trigger time ($t_{TRIGGER}$) within x minutes to x+1 minute before and after the trip start time ($t_{START}$) by n times of the value corresponding to the Z value (Z=−0.x) of the standard normal distribution.

Thereafter, the updated data pair of [start time of trip, trigger time] ([$t_{START}$, $t_{TRIGGER}$]) may be used to determine the start time of trip. As the number of trips executed by the service providing device 100 increases, the trigger time corresponding to each start time may be ideally distributed. For example, when the service providing device 100 starts a trip at $t_{START}$ by comparing the expected completion time with the target time (i.e., when the start time of the trip is determined as $t_{START}$), the service providing device 100 may start the trip earlier by the trigger time corresponding to $t_{START}$.

As described above, the service providing device 100 may update the trigger time to determine the start time of the trip, thereby ensuring that the trip is completed within the target time indicated by the user.

Figure 3:
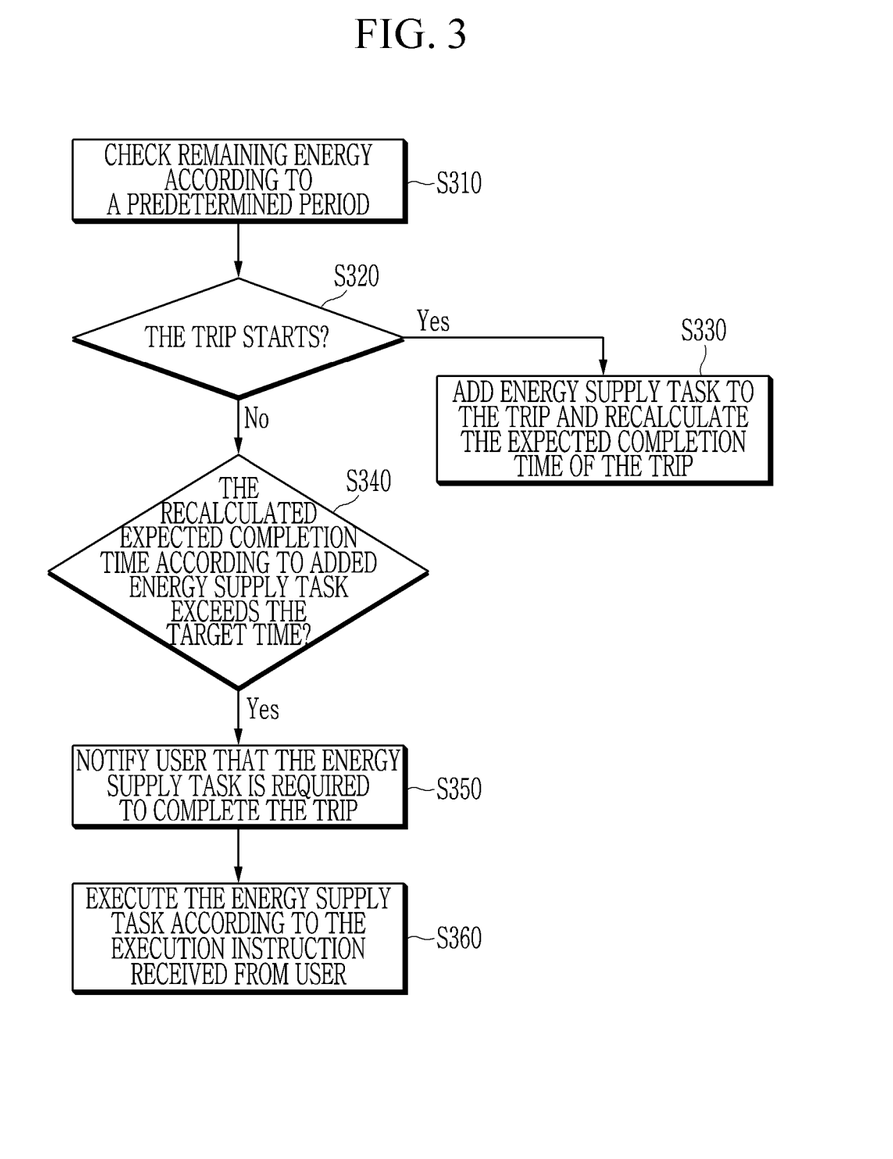
FIG. 3 is a flowchart illustrating a method for manage an autonomous during execution of a trip according to an embodiment.

FIG. 3 is a flowchart illustrating a method for manage an autonomous during execution of a trip according to an embodiment.

Referring to FIG. 3, the service providing device 100 according to an embodiment may check the remaining energy of the autonomous vehicle according to a predetermined period and check whether energy supply is required (S310).

When the autonomous vehicle runs on fossil fuel, such as gasoline, the service providing device 100 may calculate an estimated fuel consumption until the trip is completed according to the predetermined period and determine whether it is necessary to replenish the fuel during the trip.

When the autonomous vehicle is an electric vehicle, the service providing device 100 may calculate an expected electricity consumption until the trip is completed according to the predetermined period and determine whether it is necessary to charge the battery of the autonomous vehicle during the trip.

When it is determined that energy supply is required before the start of the trip, the service providing device 100 may add an energy supply task (fuel replenishment or battery charging) to the trip S320 and recalculate the expected completion time of the trip (S330).

When it is determined that the energy supply is required during the execution of the trip, the service providing device 100 may determine whether the expected completion time recalculated after the energy supply task is added to the trip exceeds the target time (S340). When the expected completion time recalculated according to the energy supply task exceeds the target time, the service providing device 100 may notify the user that the energy supply task is required to complete the trip (S350).

Thereafter, when the user transmits an execution instruction of the energy supply task through the user terminal, the service providing device 100 may execute the added energy supply task (S360).

Figure 4:
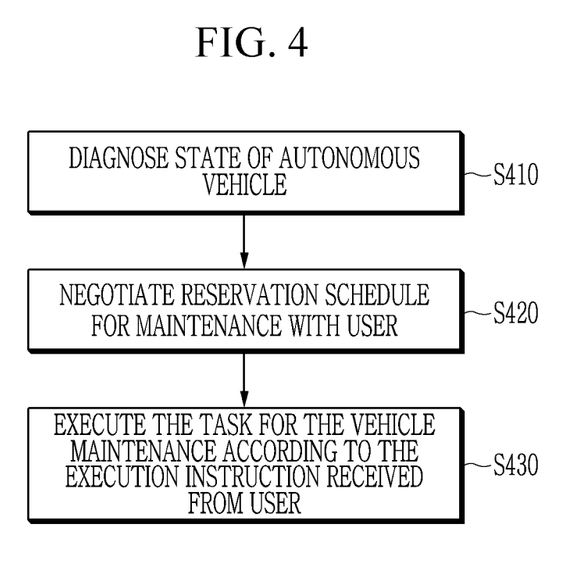
FIG. 4 is a flowchart illustrating a method for managing an autonomous vehicle during execution of a trip according to another embodiment.

FIG. 4 is a flowchart illustrating a method for managing an autonomous vehicle during execution of a trip according to another embodiment.

In another embodiment, the service providing device 100 may diagnose the state of the autonomous vehicle before the trip starts or when there is no trip information received and visit a repair shop, a gas station, an electric charging station, etc. according to the diagnosis result.

Referring to FIG. 4, the service providing device 100 may diagnose the state of the autonomous vehicle (S410). The service providing device 100 may periodically diagnose the state of the autonomous vehicle according to a predetermined period.

When it is determined that the autonomous vehicle needs refueling or charging, the service providing device 100 may visit the gas station for refueling or perform electric charging before the trip starts or before the trip information is received. In an embodiment, the service providing device 100 may perform the refueling or charging in a time period in which there is a highest probability that there is no request for service execution based on the reception history of the trip information from the user.

Referring to FIG. 4, if it is determined that maintenance for the autonomous vehicle is required based on the diagnosis result of the state of the autonomous vehicle, the service providing device 100 may negotiate a reservation schedule for the maintenance of the autonomous vehicle with the user (S420). The user may individually instruct the service providing device 100 to perform a vehicle maintenance task or instruct a plurality of tasks including the vehicle maintenance task.

Thereafter, the service providing device 100 may execute the trip according to the trip information including vehicle maintenance (S430).

As described above, the service providing device 100 according to embodiments executes at least one task for the user by utilizing the idle time of the autonomous vehicle (e.g., when the autonomous vehicle is parked at a specific location), so that the service providing device 100 can save the time that user spends doing a simple and/or trivial task and improve the quality of life of the users.

Figure 5:
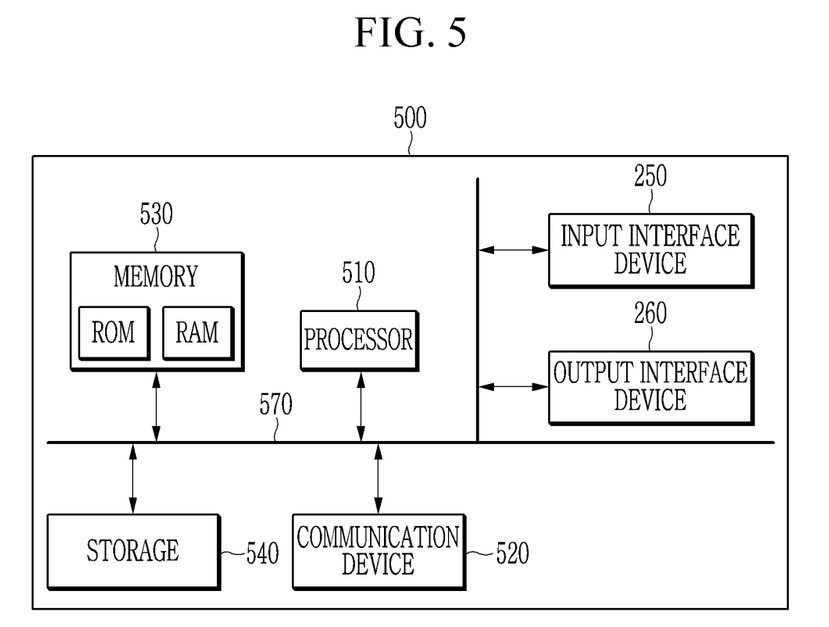
FIG. 5 is a block diagram illustrating a service providing device according to an embodiment.

FIG. 5 is a block diagram illustrating a service providing device according to an embodiment.

The service providing device according to an embodiment may be implemented as a computer system, for example, a computer-readable medium. Referring to FIG. 5, the computer system 500 may include at least one of a processor 510, a memory 530, an input interface device 550, an output interface device 560, and a storage device 540 communicating through a bus 570. The computer system 500 may also include a communication device 520 coupled to the network. The processor 510 may be a central processing unit (CPU) or a semiconductor device that executes instructions stored in the memory 530 or the storage device 540. The memory 530 and the storage device 540 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 520 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An automated driving system-dedicated vehicle (ADS-DV), comprising:
   a processor, a memory, and a communication device,
   wherein the processor executes a program stored in the memory to perform:
   starting, by the ADS-DV, a trip by controlling an autonomous vehicle;
   calculating, by the ADS-DV, an expected completion time of the trip according to a predetermined update period; and
   determining, by the ADS-DV, whether the trip is completed within a target time according to the expected completion time of the trip,
   wherein the ADS-DV periodically updates the expected completion time and compares the expected completion time with the target time,
   wherein, based on the expected completion time not exceeding the target time, the ADS-DV continues the trip and periodically recalculates the expected completion time,
   wherein, based on the expected completion time exceeding the target time, the ADS-DV changes an execution order of a plurality of tasks included in the trip, and recalculates the expected completion time according to the changed execution order,
   wherein, based on the ADS-DV periodically checking a remaining energy of the ADS-DV and determining whether energy supply is required:
   before a start of the trip, the ADS-DV adds an additional task to replenish energy to the trip;
   when an additional task to replenish energy is added after the start of the trip, the ADS-DV recalculates the expected completion time; and
   when the recalculated expected completion time exceeds the target time, the ADS-DV notifies a user that an energy replenish task is required to complete the trip.

2. The ADS-DV of claim 1, wherein the processor executes the program to further perform:
   performing the trip according to the changed execution order when the recalculated expected completion time does not elapse the target time.

3. The ADS-DV of claim 1, wherein the processor executes the program to further perform:
   transmitting a delay prediction notification of the trip to a user terminal when the recalculated expected completion time elapses the target time; and
   determining whether to continue the trip based on a selection of the user transmitted according to the delay prediction notification.

4. The ADS-DV of claim 1, wherein the processor executes the program to further perform:
   receiving a request for execution of an on-demand service through an autonomous vehicle from a user terminal, wherein the request for execution includes trip information for executing the trip.

5. The ADS-DV of claim 4, wherein the processor executes the program to further perform:
   determining whether the trip is completable based on the trip information and a current state of the autonomous vehicle; and
   responding to the request for execution according to whether the trip is completable.

6. The ADS-DV of claim 5, wherein when the processor performs the determining whether the trip is completable based on the trip information and a current state of the autonomous vehicle, the processor performs determining a completion probability of the trip based on the trip information and the current state of the autonomous vehicle.

7. The ADS-DV of claim 6, wherein when the processor performs the responding to the request for execution according to whether the trip is completable, the processor performs:
   responding that the trip is completable when the completion probability exceeds a predetermined threshold; or
   responding that the trip is not completable when the completion probability does not exceed the predetermined threshold.

8. A method of providing a service through an autonomous vehicle, the method comprising:
   starting, by an automated driving system-dedicated vehicle (ADS-DV), a trip by controlling the autonomous vehicle;
   calculating, by the ADS-DV, an expected completion time of the trip according to a predetermined update period; and
   determining, by the ADS-DV, whether the trip is completed within a target time according to the expected completion time of the trip,
   wherein the ADS-DV periodically updates the expected completion time and compares the expected completion time with the target time,
   wherein, based on the expected completion time not exceeding the target time, the ADS-DV continues the trip and periodically recalculates the expected completion time,
   wherein, based on the expected completion time exceeding the target time, the ADS-DV changes an execution order of a plurality of tasks included in the trip, and recalculates the expected completion time according to the changed execution order, and
   wherein, based on the ADS-DV periodically checking a remaining energy of the ADS-DV and determining whether energy supply is required:
   before a start of the trip, the ADS-DV adds an additional task to replenish energy to the trip;
   when an additional task to replenish energy is added after the start of the trip, the ADS-DV recalculates the expected completion time; and when the recalculated expected completion time exceeds the target time, the ADS-DV notifies a user that an energy replenish task is required to complete the trip.

9. The method of claim 8, further comprising:
performing the trip according to the changed execution order when the recalculated expected completion time does not elapse the target time.

10. The method of claim 8, further comprising:
transmitting a delay prediction notification of the trip to a user terminal when the recalculated expected completion time elapses the target time; and
determining whether to continue the trip based on a selection of the user transmitted according to the delay prediction notification.

11. The method of claim 8, further comprising:
receiving a request for execution of an on-demand service through an autonomous vehicle from a user terminal,
wherein the request for execution includes trip information for executing the trip.

12. The method of claim 11, further comprising:
determining whether the trip is completable based on the trip information and a current state of the autonomous vehicle; and
responding to the request for execution according to whether the trip is completable.

13. The method of claim 12, wherein the determining whether the trip is completable based on the trip information and a current state of the autonomous vehicle comprises:
determining a completion probability of the trip based on the trip information and the current state of the autonomous vehicle.

14. The method of claim 13, wherein the responding to the request for execution according to whether the trip is completable comprises:
responding that the trip is completable when the completion probability exceeds a predetermined threshold; or
responding that the trip is not completable when the completion probability does not exceed the predetermined threshold.

15. A method of providing a service through an autonomous vehicle, the method comprising:
receiving, by an automated driving system-dedicated vehicle (ADS-DV), a request for execution of an on-demand service through an autonomous vehicle from a user terminal;
determining, by the ADS-DV, whether a trip for the on-demand service is completable based on trip information included in the request for execution and a current state of the autonomous vehicle;
responding, by the ADS-DV, to the request for execution according to whether the trip is completable;
starting, by the ADS-DV, the trip by controlling the autonomous vehicle after it is determined that the trip is completable;
calculating, by the ADS-DV, an expected completion time of the trip according to a predetermined update period; and
determining whether the trip is completed within a target time according to the expected completion time of the trip,
wherein the ADS-DV periodically updates the expected completion time and compares the expected completion time with the target time,
wherein, based on the expected completion time not exceeding the target time, the ADS-DV continues the trip and periodically recalculates the expected completion time,
wherein, based on the expected completion time exceeding the target time, the ADS-DV changes an execution order of a plurality of tasks included in the trip, and recalculates the expected completion time according to the changed execution order,
wherein the trip includes a plurality of tasks of the on-demand service, and
wherein, based on the ADS-DV periodically checking a remaining energy of the ADS-DV and determining whether energy supply is required:
before a start of the trip, the ADS-DV adds an additional task to replenish energy to the trip;
when an additional task to replenish energy is added after the start of the trip, the ADS-DV recalculates the expected completion time; and
when the recalculated expected completion time exceeds the target time, the ADS-DV notifies a user that an energy replenish task is required to complete the trip.

16. The method of claim 15, wherein the determining whether the trip is completable based on the trip information and the current state of the autonomous vehicle comprises:
determining a completion probability of the trip based on the trip information and the current state of the autonomous vehicle.

17. The method of claim 16, wherein the responding to the request for execution according to whether the trip is completable comprises:
responding that the trip is completable when the completion probability exceeds a predetermined threshold; or
responding that the trip is not completable when the completion probability does not exceed the predetermined threshold.

* * * * *